(12) United States Patent
Sato

(10) Patent No.: US 6,185,622 B1
(45) Date of Patent: Feb. 6, 2001

(54) ELECTRONIC APPARATUS, COMMUNICATION SPEED INFORMATION COLLECTION METHOD, COMMUNICATION METHOD BETWEEN ELECTRONIC APPARATUS AND RECORDING MEDIUM

(75) Inventor: Makoto Sato, Tokyo (JP)

(73) Assignee: Sony Corporation, Tokyo (JP)

( * ) Notice: Under 35 U.S.C. 154(b), the term of this patent shall be extended for 0 days.

(21) Appl. No.: 09/057,392

(22) Filed: Apr. 8, 1998

(30) Foreign Application Priority Data

Apr. 15, 1997 (JP) .................................................. 9-096873

(51) Int. Cl.⁷ ................................................... G06F 13/00
(52) U.S. Cl. ............................................................. 709/233
(58) Field of Search ..................................... 709/200, 232, 709/233, 328

(56) References Cited

U.S. PATENT DOCUMENTS 6,038,625 * 3/2000 Ogino et al. .......................... 710/104

* cited by examiner

*Primary Examiner*—Robert B. Harrell
(74) *Attorney, Agent, or Firm*—Frommer Lawrence & Haug, LLP.; William S. Frommer

(57) ABSTRACT

The invention provides an electronic apparatus, a communication speed information collection method, a communication method between electronic apparatus and a recording medium which can minimize the possibility of drop of a communication speed by a performance of a repeating node and by which communication speed information having a high degree of reliability can be obtained. When bus resetting occurs, a parental relationship of nodes is determined automatically, and the nodes send out self ID packets in a predetermined order to a 1,394 serial bus. One of the nodes which has been determined as a bus manager produces a speed map using maximum communication speed information of physical layer controllers written in the self ID packets sent out from the nodes. Then, the node reads out configuration ROMs of the other nodes and modifies the information regarding any node wherein the maximum communication speed of the link layer controller is lower than the maximum communication speed of the physical layer controller.

16 Claims, 5 Drawing Sheets

| Bus_Info_Block _length | CRC_length *1 | rom_crc_value | |
|---|---|---|---|
| "1" (31h) | "3" (33h) | "9" (39h) | "4" (34h) |
| *2 reserved | cyc_clk_acc | max _rec (0000) | reserved (00h) |
| node_vendor_id | | | chip_id_hi |
| chip_id_lo | | | |

*: OVERALL LENGTH OF Config. ROM EXCEPT TOP QUADLET

*: | irmc (1h) | cmc (1h) | isc (1h) | bmc (0h) | irmc: isochronous resource manager capable
cmc: cycle master capable
isc: isochronous capable
bmc: bus manager capable

| 000 | S100 |
|---|---|
| 001 | S200 |
| 010 | S400 |
| 011 | S800 |
| 100 | S1600 |
| 101 | S3200 |
| OTHERS | reserved |

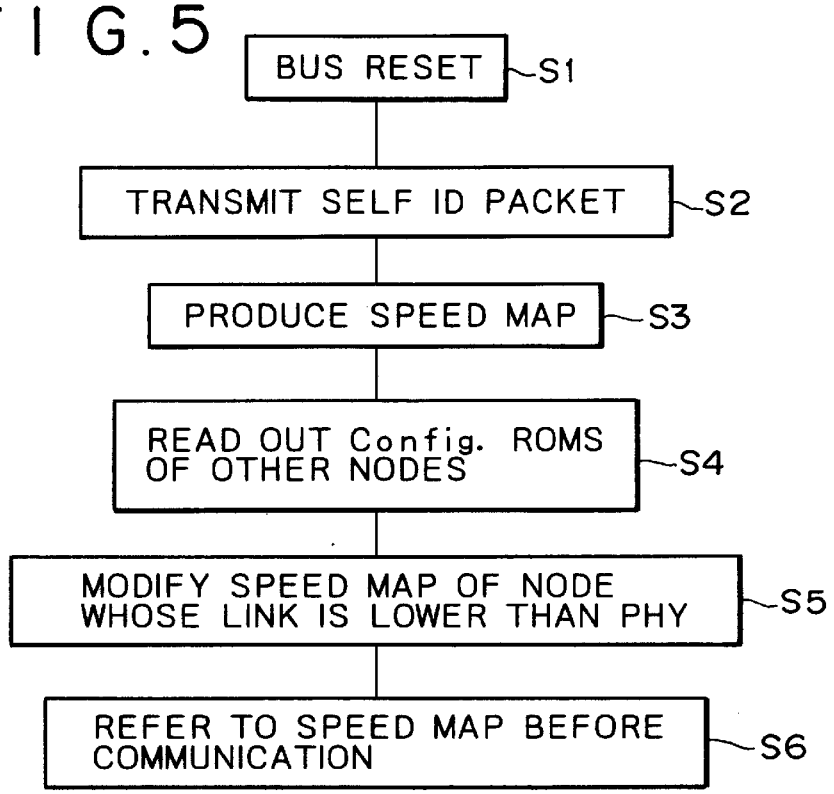
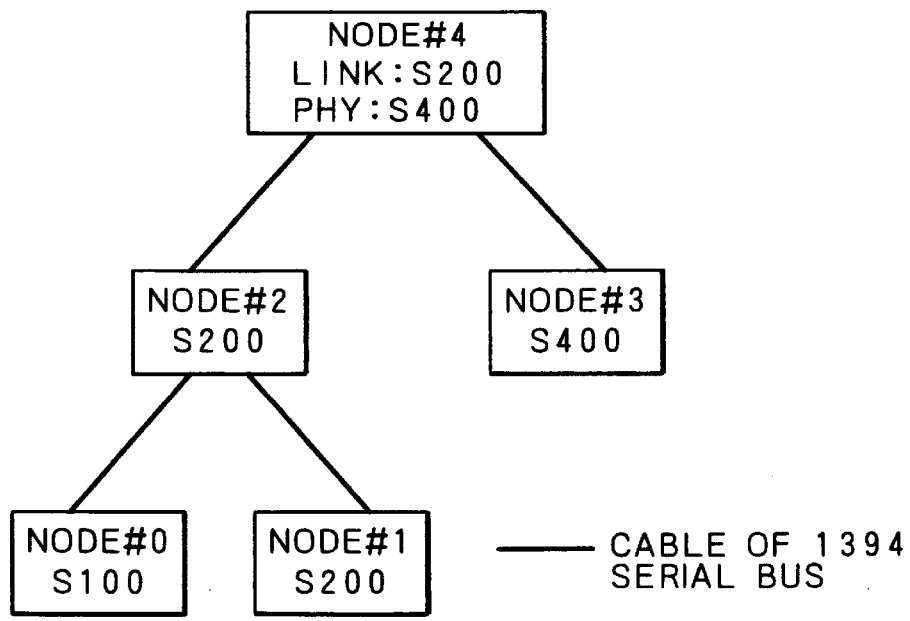

|  | NODE #0 | NODE #1 | NODE #2 | NODE #3 | NODE #4 |
|---|---|---|---|---|---|
| NODE #0 |  | S100 | S100 | S100 | S100 |
| NODE #1 | S100 |  | S200 | S200 | S200 |
| NODE #2 | S100 | S200 |  | S200 | S200 |
| NODE #3 | S100 | S200 | S200 |  | S400 |
| NODE #4 | S100 | S200 | S200 | S400 |  |

|  | NODE #0 | NODE #1 | NODE #2 | NODE #3 | NODE #4 |
|---|---|---|---|---|---|
| NODE #0 |  | S100 | S100 | S100 | S100 |
| NODE #1 | S100 |  | S200 | S200 | S200 |
| NODE #2 | S100 | S200 |  | S200 | S200 |
| NODE #3 | S100 | S200 | S200 |  | S200 |
| NODE #4 | S100 | S200 | S200 | S200 |  |

MODIFIED SPEED INFORMATION

ELECTRONIC APPARATUS, COMMUNICATION SPEED INFORMATION COLLECTION METHOD, COMMUNICATION METHOD BETWEEN ELECTRONIC APPARATUS AND RECORDING MEDIUM

BACKGROUND OF THE INVENTION

This invention relates to an electronic apparatus which is connected to and used together with, for example, an IEEE 1,394 serial bus (hereinafter referred to simply as 1,394 serial bus) and also to a communication speed information collection method, a communication method between electronic apparatus of the type mentioned, and a recording medium.

A communication system has been proposed wherein electronic apparatus such as a personal computer, a hard disk apparatus, a digital video tape recorder and a digital television receiver are connected to each other by a 1,394 serial bus so that packets of a digital video signal, a digital audio signal and a control signal are communicated between the electronic apparatus.

An example of such a communication system as described above is shown in FIG. 8. Referring to FIG. 8, electronic apparatus A to E may be a personal computer, a digital video tape recorder and so forth mentioned above. Ports P of the electronic apparatus A and B, B and C, C and D, and D and E are connected to each other by cables 11, 12, 13 and 14 of a 1,394 serial bus, respectively. In the following description, each of such electronic apparatus may be referred to as node.

As seen from FIG. 8, each of the nodes other than the node C includes, as basic components for communicating with the 1,394 serial bus, a physical layer controller (PHY) 15, a link layer controller (LINK) 16, and a CPU (central processing unit) 17. The node C is only provided with a physical layer controller 15. The physical layer controller 15 has functions of initialization of the bus, encoding/decoding of data, arbitration, outputting/detection of a bias voltage and so forth. The link layer controller 16 has link layer controlling functions such as production/detection of an error correction code, production/detection of a packet and so forth. The CPU 17 has functions of an application layer.

In a communication system which employs a 1,394 serial bus, each node sends out, upon initialization of the bus, a packet called self ID (Self ID) packet to the bus. In a predetermined field of the self ID packet, communication speed information which is available with the physical layer controller 15 of the node itself is inserted.

FIG. 9 illustrates an example of a construction of a self ID packet. Referring to FIG. 9, the self ID packet shown has a length of 4 bytes×2 (in the following description, 4 bytes are referred to as 1 quadlet), and a speed code (sp) is inserted in the 17th and 18th bits of the first quadlet. The two bits of the speed code signify S100 (98.304 Mbps) with "00", S100 and S200 (196.608 Mbps) with "01", S100, S200 and S400 (393.216 Mbps) with "10", and "reserved" with "11".

A bus manager in the communication system receives self ID packets of the nodes and produces, using the self ID packets, a speed map indicative of maximum communication speeds between the nodes. FIG. 10 shows an example of a construction of a speed map. Referring to FIG. 10, the speed map shown indicates maximum transfer speeds each between two arbitrary nodes. After completion of initialization of the bus, all nodes can refer to the speed map. When each node tries to communicate with another node, it refers to the speed map to determine a communication speed.

Generally in a communication system, the maximum transfer speed in communication between certain two nodes is limited, where there is a repeating node in the communication route, to a speed which is available with the repeating node.

For example, in a communication system which employs a 1,394 serial bus, repeating is performed by a physical layer controller. The physical layer controller transmits and receives a packet on the 1,394 serial bus. In this instance, also a packet which is not destined for the pertaining node is propagated to an adjacent node, that is, repeated. While the communication speed of each node depends upon the capacity of its link layer controller, when the node repeats a packet, the communication speed does not rely upon the capacity of the link layer controller.

When communication is performed between two nodes, there is no problem if the maximum communication speed of the link layer controller of each of the nodes is equal to or higher than the maximum communication speed of the link layer controller. However, if the maximum communication speed of the link layer controller is lower than the maximum communication speed of the physical layer controller, then a packet received by the node is lost on the level of the link layer.

In asynchronous communication on a 1,394 serial bus, a node on the transmission side of a packet can discriminate an error when a node of the reception side of the packet does not send back ACK (acknowledge). However, in isochronous communication, since communication of the broadcasting type in which ACK is not returned is performed, an error can be discriminated neither by the transmission side nor by the reception side.

Such an error as mentioned above can be eliminated if a maximum communication speed for the physical layer controller is determined based on performances of the link layer controllers of all nodes. However, this gives rise to necessity to lower the communication speed relying upon a repeating node even if two nodes which originally communicate with each other have higher performances.

SUMMARY OF THE INVENTION

It is an object of the present invention to provide an electronic apparatus, a communication speed information collection method, a communication method between communication method between electronic apparatus and a recording medium which can minimize the possibility of drop of a communication speed by a performance of a repeating node.

It is another object of the present invention to provide an electronic apparatus, a communication speed information collection method, a communication method between electronic apparatus and a recording medium by which communication speed information having a high degree of reliability can be obtained.

In order to attain the objects described above, according to the present invention, communication speeds available with individual nodes or electronic apparatus are indicated separately for a plurality of nodes. More particularly, according to an aspect of the present invention, there is provided a communication speed information collection method applied when communication is performed between a plurality of apparatus, comprising the steps of collecting communicable speed information between physical layers of the apparatus to produce a first speed information table, collecting information processable speed information of layers higher than the physical layers of the apparatus, and modifying the first speed information table with the information processable speed information of the higher layers.

According to another aspect of the present invention, there is provided a communication method applied when communication is performed between a plurality of apparatus, comprising a communication speed information collection step including the steps of collecting communicable speed information between physical layers of the apparatus to produce a first speed information table, collecting information processable speed information of layers higher than the physical layers of the apparatus, and modifying the first speed information table with the information processable speed information of the higher layers, and a communication step of performing communication between the apparatus based on the speed information obtained by the first-mentioned step.

According to a further aspect of the present invention, there is provided an electronic apparatus for communicating with another apparatus, comprising first means for performing processing of a physical layer for communicating with another apparatus, second means for performing processing of a layer higher than the physical layer, and third means for storing information of a relationship in magnitude between a communication speed by the first means and a communication speed by the second means and/or information representing the communication speeds.

According to a still further aspect of the present invention, there is provided a recording medium on which a procedure when communication is performed between a plurality of apparatus is stored, the recording medium having stored thereon a program for causing such a procedure to be executed as to collect communicable speed information between physical layers of the apparatus to produce a first speed information table, collect information processable speed information of layers higher than the physical layers of the apparatus, and modify the first speed information table with the information processable speed information of the higher layers.

With the methods and the electronic apparatus, any electronic apparatus wherein the maximum communication speed of the second means for processing a layer higher than the physical layer is lower than the maximum communication speed of the first means for processing the physical layer need not lower the performance of the first means thereof in conformity with the performance of the second means. Accordingly, when communication is performed between two arbitrary nodes in the communication system, information can be transferred with the original highest performance of the first means.

Further, since the maximum transfer speed map produced once is thereafter modified when necessary, a maximum transfer speed map having a higher degree of reliability than ever can be produced.

Furthermore, the probability that broadcasting communication can be performed at a high speed can be raised.

According to a still further aspect of the present invention, there is provided a recording medium on which a procedure when communication is performed between a plurality of apparatus is stored, the recording medium having stored thereon a program for causing such a procedure to be executed as to collect communicable speed information between physical layers of the apparatus to produce a first speed information table, collect information processable speed information of layers higher than the physical layers of the apparatus, and modify the first speed information table with the information processable speed information of the higher layers.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 5 is a flow chart illustrating a procedure up to determination of a communication speed by the node shown in FIG. 1;

FIG. 6 is a diagrammatic view showing an example of a construction of a communication system to which the present invention is applied;

DESCRIPTION OF THE PREFERRED EMBODIMENT

Figure 1:
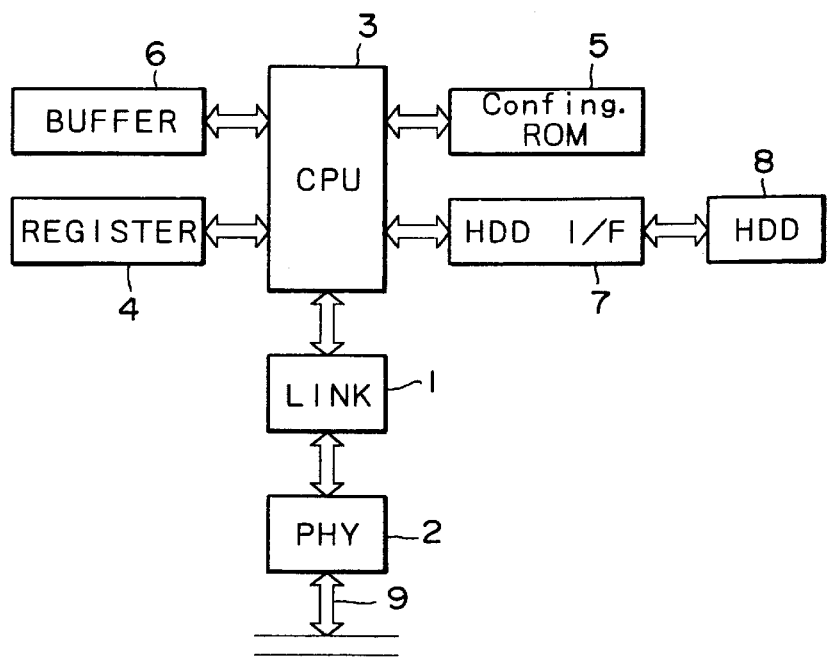
FIG. 1 is a block diagram showing a construction of part of a node to which the present invention is applied.

Referring first to FIG. 1, there is shown in block diagram a construction of part of a node to which the present invention is applied. The node shown includes a physical layer controller 1, a link layer controller 2 connected to the physical layer controller 1 by an internal bus not shown, a CPU 3 connected to the link layer controller 2 by the internal bus, registers 4, a configuration ROM 5, a buffer memory 6, and a hard disk interface 7, each connected to the CPU by the internal bus and a hard disk apparatus 8 connected to the hard disk interface 7. Further, a 1,394 serial bus 9 is connected to a port (not shown) of the physical layer controller 1.

Figure 2:
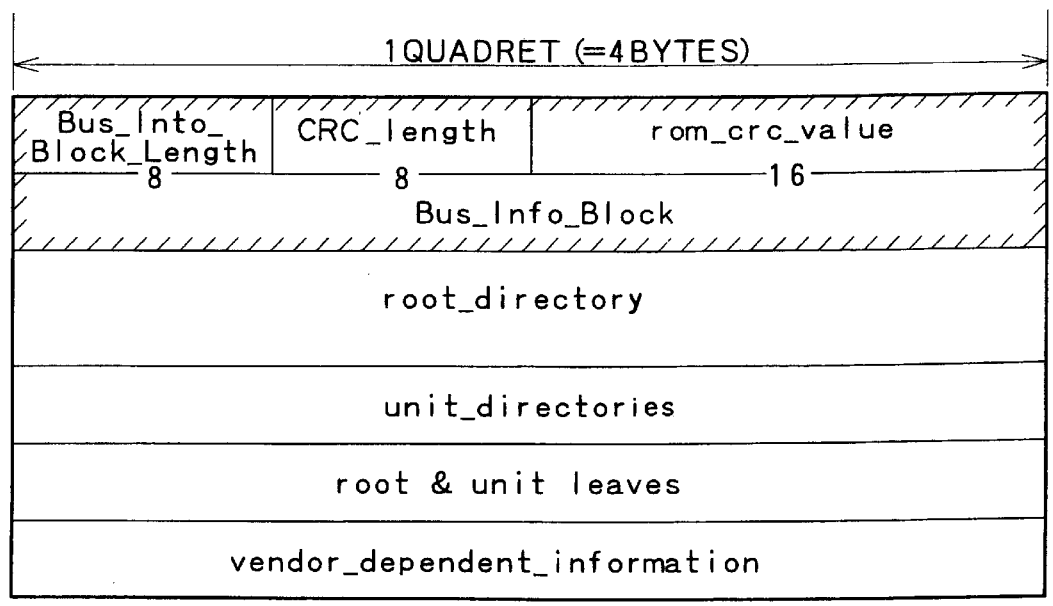
FIG. 2 is a diagrammatic view illustrating an example of a construction of a configuration ROM shown in FIG. 1.
Figures 3, 4:
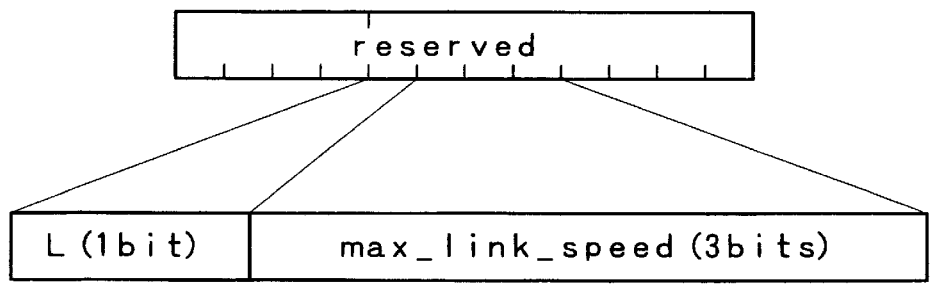
FIG. 3 is a diagrammatic view showing a construction of a portion of the configuration ROM of FIG. 2 from the top to a bus information block.
FIG. 4 is a diagrammatic view illustrating maximum communication speeds of a physical layer controller and a link layer controller.

The configuration ROM 5 is constructed, for example, in such a manner as illustrated in FIGS. 2 and 3. It is to be noted that FIG. 3 shows a detailed construction of portions indicated by slanting lines in FIG. 2. In the first one quadlet, the length of a bus information block (Bus_Info_lock_length), the length of a CRC (CRC_length), and a CRC value of the configuration ROM (rom_crc_value) are written. In a bus information block (Bus_Info_Block) of the next four quadlets, information indicating "1,394", information representative of the communication capacity of the node, information indicating an ID unique to the node and so forth are written.

In the configuration ROM 5 shown, the maximum communication speeds of the physical layer controller and the link layer controller are represented using 4 bits of totaling 12 bits of "0" which are reserved in the field in which information representative of the communication capacity of the node is written. As seen from FIG. 4, the relationship in magnitude between the maximum communication speed of the link layer controller and the maximum communication speed of the physical layer controller is represented by one bit denoted as L bit.

When the L bit is "1", the maximum communication speed of the link layer controller is lower than the maximum speed of the physical layer controller. Further, the maximum communication speed of the link layer controller in this instance is written in a maximum link speed (max_link_speed) of the following 3 bits. In particular, the 3 bits represent S100 with "000", S200 with "001", S400 with "010", S800 with "011", S1600 with "100", and S3200 with "101", and "reserved" with the other values.

Where the L bit is "0", the maximum communication speed of the link layer controller is equal to or higher than the maximum communication speed of the physical layer controller. In this instance, since the maximum communication speed of the link layer controller need not be indicated, the 3 bits may be "000" same as the original reservation information.

In the present embodiment, after the maximum communication speed information of the physical layer controllers written in self ID packets upon bus initialization is referred to produce a speed map, the configuration ROMs are read out, and when any of the L bits thus read is 1, the speed map is modified in accordance with the necessity. The procedure is described below with reference to the flow chart of FIG. 5.

First, bus resetting occurs (step S1). After the bus resetting occurs, a parental relationship of the nodes is determined automatically in accordance with IEEE 1,394 protocol (procedure prescribed in the IEEE-1394-1995 standard), and further, the nodes individually send out self ID packets successively beginning with a child node to the 1,394 serial bus (step S2).

A node which has been determined as a bus manager stores maximum communication speed information (speed codes) of the physical layer controllers written in the self ID packets sent out from the nodes into the buffer memory 6, produces a speed map using the stored maximum communication speed information and stores the speed map into one of the registers 4 (step S3). It is to be noted that, since which one of the nodes should be determined as a bus manager is described in detail in the plan mentioned above, description of it is omitted here.

The node which has been determined as a bus manager then reads out the configuration ROMs 5 of the other nodes (step S4). Then, the node decreases information of those nodes of the speed map stored in the register 4 whose L bit in FIG. 4 is "1" to the value of the maximum link speed (step S5).

Production of the speed map taking the maximum communication speed of the link layer controller into consideration is thus completed. When each node tries to communicate with another node, it should refer to the speed map stored in the register 4 of the bus manager to determine a communication speed (step S6).

A program which corresponds to the flow chart described above is stored in the hard disk apparatus 8 of FIG. 1, and the CPU 3 reads out the program through the hard disk interface 7 and develops it into the buffer memory 6 to execute processing of it. A related art node which does not cope with the processing can be modified so as to cope with the processing by rewriting the stored contents of the hard disk apparatus. In this instance, if the node includes a floppy disk apparatus, then the CPU reads the program from the floppy disk apparatus and re-writes the stored contents of the hard disk apparatus. Even if the node does not include a floppy disk apparatus, the node can receive the program from an external node through the 1,394 serial bus and re-write the stored contents of the hard disk apparatus.

Subsequently, production of and modification to the speed map are described taking the communication system shown in FIG. 6 as an example. Referring to FIG. 6, the communication system includes five nodes #0 to #4. In each of the nodes #0 to #3, the maximum communication speed of the physical layer controller and the maximum communication speed of the link layer controller are equal to each other, and they are S100, S200, S200 and S400, respectively. In short, the L bit in the configuration ROM of each of the nodes #0 to #3 is "0". Meanwhile, in the node #4, the maximum communication speed of the link layer controller is lower than the maximum communication speed of the physical layer controller, and they are S200 and S400, respectively. In short, the L bit in the configuration ROM of the node #4 is "1", and the maximum link speed is "001".

Figures 7A, 7B:
FIGS. 7A and 7B are diagrammatic views showing speed maps produced by the communication system shown in FIG. 6.
Figure 8:
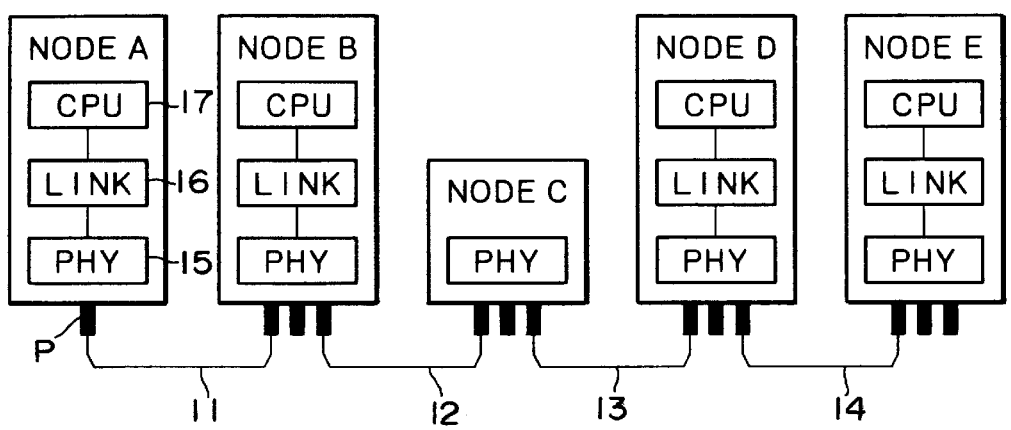
FIG. 8 is a block diagram showing an example of a communication system connected using a 1,394 serial bus.
Figure 9:
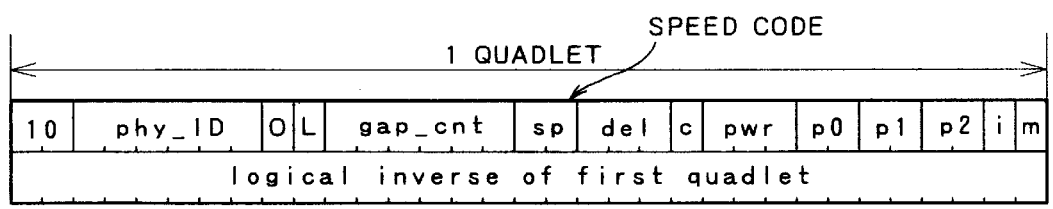
FIG. 9 is a diagrammatic view illustrating an example of a construction of a self ID packet.
Figure 10:
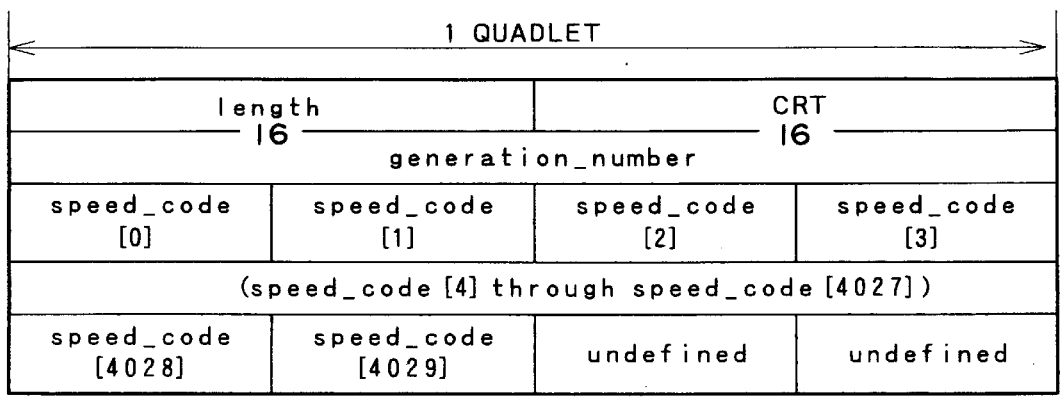
FIG. 10 is a diagrammatic view illustrating an example of a construction of a speed map used in the communication system of FIG. 8.

Thus, such a speed map as shown in FIG. 7A is produced by the processing up to step S3 of FIG. 5. In particular, since the maximum communication speed of the physical layer controller of the node #0 is S100, the maximum communication speed when the node #0 communicates with the other nodes #1 to #4 is S100. Since the maximum communication speed of the physical layer controller of the node #1 is S200, the maximum communication speed when the node #1 communicates with the nodes #2 to #4 is S200. This also applies to the node #2. Since the maximum communication speed of the physical layer controller is S400 with both of the node #3 and the node #4, the maximum communication speed between them is S400.

Thus, the speed map modified by the processing up to step S5 of FIG. 5 is such as illustrated in FIG. 7B. In particular, since the maximum speed of the link layer controller of the node #4 is S200 and is lower than the maximum communication speed of the physical layer controller which is S400, the maximum communication speed between the node #4 and the node #3 is modified to S200.

In this manner, in the present embodiment, a speed map having a higher degree of reliability than ever can be produced. Besides, since the maximum communication speed information of the link layer controller is written in an area of the configuration ROM which is read by the bus manager, there occurs no burden such that the number of communications is increased in order to acquire the maximum communication speed information. Furthermore, any node wherein the maximum communication speed of the link layer controller is lower than the maximum communication speed of the physical layer controller need not lower the performance of the physical layer controller as low as that of the link layer controller, and is guaranteed to effect repeating with the original highest performance thereof.

It is to be noted that, in the description above, the bus manager produces a speed map. Since the speed map of the bus manager is accessed from the other nodes, the bus manager must produce the speed map. Meanwhile, also any other node than the bus manager may produce a speed map in a similar manner. If a node other than the bus manager produces a speed map, then when it communicates with another node, it is only required to refer to the speed map produced by itself and need not access the speed map of the bus manager any more.

Further, while the foregoing description relates to a case wherein, when the maximum communication speed of the link layer controller of a node which is connected to and used with a 1,394 serial bus is lower than the maximum communication speed of the physical layer controller, this is reflected on a speed map, the present invention can be applied also to a node which is connected to and used with any other bus than a 1,394 serial bus. Further, the present invention can be applied similarly to a node wherein the maximum communication speed of a layer higher than the link layer is lower than the maximum communication speed of the physical layer or the link layer.

Having now fully described the invention, it will be apparent to one of ordinary skill in the art that many changes and modifications can be made thereto without departing from the spirit and scope of the invention as set forth herein.

What is claimed is:

1. An electronic apparatus for communicating with another device, comprising:
   first means for performing processing of a physical layer for communicating with said another device;
   second means for performing processing of a layer higher than said physical layer; and
   third means for storing information of a relationship in magnitude between a communication speed by said first means and a communication speed by said second means and/or information representing the communication speeds.

2. An electronic apparatus according to claim 1, wherein said third means is a ROM in which a setting condition is stored in advance.

3. An electronic apparatus according to claim 2, further comprising fifth means for storing communication speed information based on information obtained from said another device and/or information of said electronic apparatus.

4. An electronic apparatus according to claim 3, wherein said fifth means first stores the communication speed information in a predetermined condition, then modifies the communication speed information stored therein with information collected in another condition, and stores the modified communication speed information.

5. An electronic apparatus according to claim 1, wherein the communication is performed in conformity with the IEEE 1394 protocol.

6. An electronic apparatus according to claim 1, further comprising fourth means for reading out the information stored in said third means.

7. An electronic apparatus for communicating with another device, comprising:
   a first processor for processing a physical layers for communicating with said another device;
   a second processor for processing a layer higher than said physical layer; and
   a memory for storing information of a relationship in magnitude between a communication speed by said first processor and a communication speeds.

8. An electronic apparatus according to claim 7, wherein said memory is a ROM.

9. An electronic apparatus according to claim 8, further comprising a buffer for storing communication speed information based on information obtained from said another device and/or information of said electronic apparatus.

10. An electronic apparatus according to claim 9, wherein said buffer first stores the communication speed information in a predetermined condition, then modifies the communication speed information stored therein with information collected in another condition, and stores the modified communication speed information.

11. An electronic apparatus according to claim 7, wherein the communication is performed in conformity with the IEEE 1394 protocol.

12. A communication speed information collection method applied when communication is performed between a plurality of devices, comprising the steps of:
    collecting communicable speed information between physical layers of a respective device to produce a first speed information table;
    collecting information-processable speed information of layers higher than the physical layers of said respective device; and
    modifying said first speed information table with the information-processable speed information of the higher layers.

13. A communication speed information collection method according to claim 12, wherein the communication is performed in conformity with the IEEE 1394 protocol.

14. A communication method for collecting communication speed information applied when communication is performed between a plurality of devices, comprising the steps of:
    collecting communicable speed information between physical layers of a respective device to produce a first speed information table;
    collecting information-processable speed information of layers higher than the physical layers of said respective device; and
    modifying said first speed information table with the information-processable speed information of the higher layers; and
    a communication step of performing communication between the devices based on the speed information obtained by the step of collecting communicable speed information.

15. A communication method according to claim 14, wherein the communication is performed in conformity with the IEEE 1394 protocol.

16. A recording medium on which a procedure when communication is performed between a plurality of devices is stored, said recording medium having stored thereon a program for causing such a procedure to be executed comprising the steps of:
    collecting communicable speed information between physical layers of a respective device to produce a first speed information table;
    collecting information-processable speed information of layers higher than the physical layers of said respective device; and
    modifying said first speed information table with the information-processable speed information of the higher layers.

* * * * *